United States Patent [19]

Moore

[11] 4,069,175

[45] Jan. 17, 1978

[54] METHOD FOR PRODUCING DIMENSIONALLY STABLE UREA-FORMALDEHYDE FOAMS

[75] Inventor: William Percy Moore, Hopewell, Va.

[73] Assignee: Waverly Chemical Co., Hopewell, Va.

[21] Appl. No.: 761,301

[22] Filed: Jan. 21, 1977

[51] Int. Cl.$^2$ .............................................. C08V 9/30
[52] U.S. Cl. ........................ 260/2.5 F; 260/29.4 R; 260/39 SB
[58] Field of Search ......................... 260/2.5 F, 39 SB

[56] References Cited

U.S. PATENT DOCUMENTS

| 2,273,367 | 2/1942 | Meyer | 260/2.5 F |
| 2,947,647 | 8/1960 | Hart et al. | 260/2.5 FP |
| 3,457,199 | 7/1969 | Wells | 260/2.5 F |

*Primary Examiner*—Morton Foelak

[57] ABSTRACT

Method of producing a dimensionally stabilized urea-formaldehyde foam which comprises preparing a neutral concentrated partially cured aqueous urea-formaldehyde resin, combining said neutral resin with a froth produced by forcing air through a dilute acidic aqueous surfactant solution to activate the urea-formaldehyde foam cure, immediately thereafter combining the curing urea-formaldehyde foam with a substantially non-ionic liquid additive containing dissolved urea and suspended linearly shaped refractory solid particles, completing the acid catalyzed foam cure, and drying. Foam dimensional stability is maximized when the non-ionic liquid additive contains 10–20% by weight dissolved urea and 10–20% by weight suspended attapulgite clay.

1 Claim, No Drawings

METHOD FOR PRODUCING DIMENSIONALLY STABLE UREA-FORMALDEHYDE FOAMS

BACKGROUND OF THE INVENTION

This invention relates to dimensionally stable urea-formaldehyde foams, and more particularly to a method of modifying the conventional foam preparation to increase dimensional stability by the continuous admixing of a concentrated aqueous suspension of substantially un-ionized, linearly shaped, refractory particles, with fluid urea-formaldehyde foam containing ionized mineral acid. Such foams are used for heat and sound insulation in commercial and residential buildings where foam stability over long periods of time is essential.

Urea-formaldehyde foams after curing and drying are relatively light weight, and possess good heat and sound insulating properties. The foams are normally applied as a wet, partially cured, fluid froth which flows into and accurately fills areas or cavities to be insulated. The prior art has reported solution to many of the problems relating to application, such as production of uniform foam cell size and constant composition of the resin-curing agent blend. The excellent insulating properties, the relatively low cost, and the ease and accuracy of application are factors which should allow urea-formaldehyde foams to become a major commercial insulation material.

Unfortunately, urea-formaldehyde foams developed to date and reported in the prior art do not have the integrity required for commercial utility. Integrity is used here to indicate an ability to remain constant and unchanged throughout long periods of use as insulation. The prior art foams have lacked both physical and chemical integrity under normal use conditions. That is, the physical size, shape, contiguality, appearance, crystallinity, and the chemical composition of the urea-formaldehyde foams have changed significantly to the detriment of their insulating effectiveness. These conventionally prepared urea-formaldehyde foams, therefore, produce inferior insulation after the foams have lost their physical and chemical integrity.

Copending U.S. application Ser. No. 761,321 by this inventor, filed the same day as this application, discloses that chemical integrity of urea-formaldehyde foams may be preserved through long periods of use by modification of a partially cured urea-formaldehyde resin by acid catalyzed reaction with a water soluble dialdehyde, such as glyoxal, and supplemental urea. Although preservation of the chemical integrity of the foam provides a significant improvement in the utility of urea-formaldehyde foams, it does not provide a completely satisfactory insulating material, where dimensional instability and linear shrinkage of the foam occurs.

Conventional urea-formaldehyde foams start to lose their dimensional integrity about as soon as drying is complete. The most damaging aspect of the loss of dimensional integrity is shrinkage. Although depth shrinkage of contiguous foam insulating blocks causes some reduction in insulating effectiveness, linear shrinkage is still more damaging. Linear shrinkage normally opens cracks in or around contiguous blocks or pieces of foam and creates insulation by-passes where heat or sound easily flow, thus destroying the effectiveness of the insulation.

It is therefore a primary object of this invention to provide a method of producing a substantially dimensionally stable urea-formaldehyde insulating foam.

It is another object of this invention to provide a method for modifying urea-formaldehyde foam to produce a substantially non-shrinking insulating foam.

It is still another object of this invention to provide a method for modifying urea-formaldehyde foams to increase physical integrity and strength.

These and other objects will be evident from the following description of the invention.

SUMMARY OF THE INVENTION

It has now been discovered that the foregoing objects can be accomplished and a dimensionally stable urea-formaldehyde insulating foam can be produced by preparing a neutral partially cured aqueous urea-formaldehyde resin, combining said neutral resin with frothed curing solution produced by forcing air through a dilute aqueous surfactant solution containing substantially ionized mineral acid, blending the combined partially cured resin and frothed curing solution and a substantially un-ionized aqueous suspension of finely divided, linearly shaped, refractory solid particles, completing the curing of the combined foam, and drying. Surprisingly, the insulating foam prepared by this method has sufficient dimensional stability, after application and curing, that it may be used as insulation for long periods of time in hot, humid environments with substantially no detrimental shrinkage. Even more surprising, is the immediate strength given to the foam as it is dispensed and the improvement in structural strength throughout long periods of insulation service, after curing. Loss of dimensional integrity by shrinkage and formation of cracks in contiguous blocks of conventional urea-formaldehyde foams begins almost immediately after the foam is dried, and after about a year in normal building insulation service linear shrinkage of the foam amounts to 5 percent, or more. Modified urea-formaldehyde foams prepared by the method of this invention, employing the addition of a non-ionic aqueous suspension of finely divided, linearly shaped, refractory solid particles, have been found to be virtually unchanged in dimension, and effectiveness of insulation is unimpaired after use periods covering several years. Attapulgite clay is the preferred source of the linearly shaped refractory solid particles.

It has been discovered that finely divided linearly shaped refractory particles can be made into suspensions with low viscosities which may be readily pumped, stored, and handled when ionization of the liquid is maintained at a low level. Electrical conductivity is a convenient method for measuring ionization in aqueous solutions. Where electrical conductivities are maintained below 0.0001 ohms$^{-1}$centimeters$^{-1}$, the linearly shaped refractory particles may be suspended in concentrations as high as 24% without the suspension becoming too viscous to handle readily in standard centifugal pumps and equipment. The suspension may carry other desirable ingredients for the foam such as organic humectants and additional urea so long as the ionization is low and electrical conductivity of the suspension does not exceed .0001 ohms$^{-1}$centimeter$^{-1}$.

Further, it has been discovered that the addition of highly ionized acid causes the linearly shaped refractory particles to orient themselves along the interstitial lines formed between the individual foam cells when reacted with a highly ionized acid. These oriented rerefractory particles remain in the interstices of the foam cells after the resin has cured and dried, and add structural strength and long term dimensional stability to the urea-formaldehyde foams. The particles become oriented in the interstices when either highly ionized acids or bases are added to the foam containing the said solid particles. Without the addition of ionized liquids the particles are randomly suspended in the foam. Ionized bases or salts are not effective in catalyzing the cure of urea-formaldehyde resins and are of no value in improving the dimensional stability of urea-formaldehyde foams. Highly ionized mineral acids which were found to be highly effective in orienting the linear solids in foam while at the same time curing the urea-formaldehyde resin, were sulfuric acid and orthophosphoric acid.

In carrying out the method according to my invention a partially cured urea-formaldehyde solution is prepared in a conventional manner, having a formaldehyde to urea mol ratio of about 2 and a total solids content between 40 and 65%. In the preferred method, the partially cured resin is prepared by dissolving urea, and urea-formaldehyde concentrate, containing 85% solids and 15% water, in water to form a solution containing about 2 mols formaldehyde to 1 mol urea and about 60% total solids. The pH of the solutions brought to 5.0 by addition of orthophosphoric acid and temperature is increased to about 90° C, where curing occurs until viscosity of the solution increases to about 40 centipoise at 25° C. Maximum cooling is applied and the partially cured resin is neutralized to about pH 7.0, by the addition of sodium hydroxide solution, and stored for subsequent use. The term, partially cured resin, is used here to denote a urea-formaldehyde solution which has been polymerized to a point where the physical properties of the original ingredients are no longer evident and the viscosity has increased so that the pumping and pouring properties have changed visibly from those of the original ingredients. The partially cured resins are clear liquid polymers which have not reached the high molecular weights required to form solid urea-formaldehyde foams.

The partially cured resin solution is continuously combined with a frothed curing solution, produced by forcing air through a dilute aqueous surfactant containing a highly ionized acid. The curing agent must have an electrical conductivity of 0.1 ohm$^{-1}$centimeter$^{-1}$ or more to provide adequate orientation of the solid particles in the foam. In the preferred method about 2 parts of curing agent is frothed and combined with 1 part of partially cured resin plus additives. The curing agent is a dilute aqueous solution containing about 1% highly ionized sulfuric acid and about 2% of a foam-forming surfactant, preferably an alkyl polyoxyethylene ether or alkyl benzene sulfonic acid. The term froth is used to denote a temporary foam, well drained of excess liquid, separated upwardly from the liquid from which it is generated by the passage of air through an aperture located in the bottom of the said liquid. Best operation to allow adequate blending of resin, and solid refractory particle additives with the froth is achieved with froth volumes between 30 and 75 times the volume of the curing solution. When the neutral partially cured resin is combined with the frothed curing agent, the resin curing process is catalytically reactivated and the fluid foam thus produced is highly ionized and has an electrical conductivity of at least 0.01 ohms$^{-1}$centimeters$^{-1}$.

A substantially un-ionized liquid suspension containing between 10 and 25% finely divided, linearly shaped, refractory solids and between 10 and 25% urea is continuously added to the combined partially cured resin and frothed curing solution. As soon as the un-ionized liquid suspension blends with the highly ionized foam, the refractory solids become oriented along the foam cell interstices and drastically increase foam viscosity and strength. Preferred refractory solids are particles of attapulgite clay which have passed through a 325 mesh Tyler Screen. The solid particles have a diameter less than 0.01 mm and a length less than 0.1 mm. The amount of additive can be varied as desired to optimize operating viscosity, but between 10–20% refractory solids in the final dry foam are required to provide adequate dimensional stability. Viscosity of the foam in process is too high for practical continuous operation if the solids content is increased above 20%.

The combined partially cured resin, frothed curing solution, and un-ionized suspension of solids are completely blended and continuously dispensed as a viscous fluid foam to form a contiguous mass, located where insulation is desired. Cure of the resin continues while the foam dries.

The efficacy of the linearly shaped refractory solids in providing strength and dimensional stability to urea-formaldehyde is surprising. While the addition of linearly shaped particles of attapulgite clay allow substantially no linear shrinkage of urea-formaldehyde foam after one year service as heat insulation in the wall of a residence, the addition of more nearly cubical refractory particles, such as river sand, and Bentonite clay have no effect on the dimensional stability of foam. The substantially un-ionized liquid suspension is completely effective in improving dimensional stability so long as it contains water and adequate amounts of linearly shaped refractory particles.

The method of this invention is best carried out at temperatures between 0° C and 40° C, and at pressures between 1 and 3 atmospheres. Lower temperatures than 0° C cause a very high viscosity when the ionized acid catalyst contacts the additive containing the linearly shaped particles.

A conventional partially cured liquid or dry urea-formaldehyde resin may be used as the starting point for production of dimensionally stable foams. Starting from unpolymerized urea and formaldehyde is normally preferred from the standpoint of quality control.

DESCRIPTION OF THE PREFERRED EMBODIMENTS

The following specific examples illustrate the effectiveness of the method of this invention for producing dimensionally stable urea-formaldehyde foams with regard to the details of the method employed and to the dimensional stability of the insulating foams produced therefrom. All parts are by weight unless otherwise specified. It is to be understood that these examples are merely illustrative and there is no intent to limit the invention thereto.

EXAMPLE 1

A partially cured aqueous urea-formaldehyde resin was prepared by adding at ambient temperature, 3733 parts aqueous 40% urea solution, 4267 parts of urea-formaldehyde concentrate-85 (a mixture containing 60% formaldehyde, 25% urea, and 15% water) to a stainless steel reactor, equipped with an agitator and circulating pump, and a jacket for heating and cooling.

The mixture was brought to pH 5.0 by addition of 25 parts of orthophosphoric acid, furnace grade, and heated to 93° C. Agitation was continued and pH and temperature were maintained until viscosity of the reaction mixture had increased to 40 centipoise, measured at 25° C.

Maximum cooling was applied and sodium hydroxide solution, containing 40% NaOH, was added directly to the agitated mixture to increase the pH of the mixture to 7.1. The cooled partially cured aqueous resin was stored, analyzed, and found to contain 2.02 mols formaldehyde per mol of urea and a total solids content of 64.1'%.

An additive suspension was prepared by adding to a stainless steel reactor, at ambient temperature, 4000 parts of 40'% aqueous urea solution, 1120 parts technical grade dipropylene glycol, 32 parts tetrasodium pyrophosphate, 1248 parts water, and 1600 parts of attapulgite clay. The attapulgite clay used was Min-U-Gel 200, 95% of which passed through 325 mesh Tyler Screen. The attapulgite clay was nearly neutral at pH 7.5 (3% mixture) and contained 11% moisture. The complete mixture was circulated through a 2 inch by 2 inch Crown Model PO 9FPKS, self-priming centrifugal pump having a 5 inch semi-open impeller, driven by a 5 horsepower motor turning at 3525 revolutions per minute. The reactor was also equipped with a 1 housepower Lightnin propeller mixer to help in wetting the clay initially. After 15 minutes circulation and agitation, the clay was homogeneously and completely suspended throughout the liquid. Viscosity of the suspended clay was 30 centipoise at 25° C, pH was 7.2, and electrical conductivity was measured to be .000025 ohms$^{-1}$centimeters$^{-1}$. The low conductivity indicated a low state of ionization.

A resin-curing solution was prepared by mixing in an open Fiberglas tank equipped with a circulating pump, ingredients as follow: water, 97.5 parts; 98% sulfuric acid, 0.5 parts; and "Flo-Mo" surfactant (80% alkyl polyoxyethylene ether), 2.0 parts.

The resin curing solution was converted to a froth by forcing air at a rate of 7 ft$^3$/minute through 12 nozzles in a circular air sparger located along the bottom of a frothing chamber, which consisted of a 12 inch diameter cylinder, 24 inches tall. Liquid level of the curing solution was automatically maintained 4 inches above the level of the air sparger by curing solution pumps activated by a level control device located on the side of the froth chamber. The froth rose continuously from the liquid surface, filled the upper portion of the chamber while excess liquid drained back to the liquid surface, and the froth then left the chamber through a single 2 inch diameter nozzle located in the center of the sealed top cover. The froth was carried by flexible 2 inch diameter hose to a blending device to meet the partially cured resin and the clay additive suspension. Electrical conductivity of the curing solution was measured to be 0.12 ohm$^{-1}$cm$^{-1}$, indicating a high level of ionization.

The partially cured urea-formaldehyde resin and the clay additive suspension were continuously supplied by a variable speed gear pump from a feed tank to the blending device. The blending device consisted of two ⅜ inch schedule 10 stainless steel pipes welded concentrically into a 2 inch stainless steel schedule 10 pipe so that the temporary froth entered through the top and the partially cured resin and the clay additive suspension entered through ⅜ inch pipes from the sides of the larger pipe. The ⅜ inch pipe feeding the partially cured resin extended along the centerline of the 2 inches pipe to a point 3 inches from the discharge end, while the ⅜ inches pipe feeding the clay additive suspension extended to within ½ inches of the discharge end. At the discharge end of the blending device, a flexible 2 inches diameter hose 25 feet long was attached for completing the blending of the foam ingredients and for dispensing the foam.

The partially cured resin was continuously fed through the resin inlet pipe at a rate of 3.85 pounds per minute and the temporary curing froth supplied amounted to 13.0 pounds per minute. The resin and the temporary curing froth were brought together and then the clay additive suspension was introduced at a rate of 3.15 pounds per minute. The three components comingled as they passed through the blending device and the dispensing hose. As soon as the partially cured resin contacted the frothed curing solution, resin curing was reactivated. When the concentrated clay additive suspension contacted the highly ionic blend of frothed curing solution and resin, the mixture started to thicken at a rapid rate. The completely blended modified urea-formaldehyde foam having cell sizes of about 0.2 millimeter in diameter, was discharged from the dispensing tube in a continuous homogeneous stream, and was used to form a contiguous mass of foam for completion of curing and drying in test containers, where the properties could be accurately determined during accelerated and actual aging tests. Analysis of the final cured foam was as follows:

| Components of Dry Modified Urea-Formaldehyde Foam | Wt. % |
| --- | --- |
| Urea | 41.0 |
| Formaldehyde | 27.0 |
| Clay | 14.0 |
| Dipropylene Glycol | 9.7 |
| Others (by difference) | 8.3 |

EXAMPLE 2

The procedure and rates used for producing clay modified urea-formaldehyde foams in example 1 were duplicated, except that no partially cured resin was fed to the blending device. Viscosity of the concentrated clay additive, as used in example 1, was measured and found to be 50 centipoise at 25° C. After blending with the frothed curing solution, the viscosity of the concentrated clay additive had increased to 7,000 centipoise at 25° C, and the blend thus formed was very firm. Even without resin the foam remained intact and did not collapse for a period of 8 hours.

EXAMPLE 3

Modified urea-formaldehyde foam produced in example 1 was dispensed into two simulated wall panels 4 feet wide and 8 feet long and 4 inches thick. The panels were formed by using 2 × 4 inches timbers located on 16 inches centers, closed on each end by a 2 × 4 inches timber. The back of these panels were closed with standard grade ½ inches plywood sheets. The front of the panel 1 was left open, and the front of panel 2 was covered by ½ inches thick paper covered gypsum wall board.

Both panels were completely filled with foam produced in example 1, allowed to dry, and stored in the attic of a building located in eastern Virginia. Temperatures were as high as 120° F in the summer and as low as 8° F in the winter and relative humidity varied from 100% to 15%.

An identical series of panels were prepared using the same urea-formaldehyde resins which contained no attapulgite clay or other linearly shaped refractory solids.

After a one year storage period, running from March 1 to March 1, careful measurements and observations to detemine shrinkage were made of the contiguous masses of the foams in the test panels. The results, with the panels containing no clay designated N, are tabulated with regard to the panel numbers as follow:

| Panel Number | Shrinkage, percent | | |
|---|---|---|---|
| | Length | Width | Depth |
| 1 | 1.7 | 1.9 | 0.0 |
| 2 | 0.8 | 1.1 | 1.6 |
| 1N | 6.0 | 6.3 | 5.5 |
| 2N | 4.5 | 5.5 | 5.0 |

The contiguous masses of foam containing no attapulgite clay contained cracks along the lines where the original foam was dispensed. These cracks and the somewhat larger cracks along the foam interfaces with the timbers, would seriously reduce the insulating value of the panel, allowing by-pass of heat and sound. There were no internal cracks in the foam containing the clay additive, and the cracks along the interfaces with the wood timbers were about 1/16 inches and not large enough to allow appreciable heat or sound to by-pass the insulation.

EXAMPLE 4

Samples of foam were removed from panels 2 and 2N produced in example 3, after 1 years storage. Measurement was made of the weight the foam would support before collapse, by adding calibrated weights to a 2 inches cube, until the cube broke through the foam. The resistance to compression of the untreated foam in panel 2N was determined to be 23 ounces per square inch compared to 85 ounces per square inch with foam in panel 2 containing the attapulgite clay additive.

EXAMPLE 5

A commercial partially cured spray dried urea-formaldehyde resin, prepared by the process of U.S. Pat. No. 3,470,115, was obtained which contained 2.5% moisture and had a formaldehyde to urea mol ratio of 1.98. Resin amounting to 60 parts was added to 40 parts of water.

The aqueous commercial resin was combined with the concentrated attapulgite clay suspension and the frothed curing solution using the same methods and amounts used in example 1. The completely blended foam was dispensed into open wood boxes two feet square and four inches deep. After one years storage, shrinkage was found to be about 1 percent or less in each dimension.

While the above describes the preferred embodiments of my invention, it will be understood that variations may be made therefrom within the scope of the specifications and claims.

We claim:

1. A method for producing dimensionally stable urea-formaldehyde foam which comprises an aqueous neutral urea-formaldehyde resin having a formaldehyde to urea mol ratio of about 2, a viscosity of about 40 centipoise and a solids content between 40 and 65%, combining the said resin with frothed curing solution containing about 1% sulfuric acid and about 2% surfactant and having an electrical conductivity of at least $0.1$ $\text{ohm}^{-1}\text{centimeter}^{-1}$, continuously blending the combined resin and curing solution foam with a substantially un-ionized liquid suspension having an electrical conductivity lower than $0.00001$ $\text{ohms}^{-1}\text{centimeter}^{-1}$ and containing between 10 and 25% attapulgite clay sized to pass through a 325 mesh Tyler Screen, curing and drying the combined foam at temperatures between 0° C and 35° C.

* * * * *